UNITED STATES PATENT OFFICE.

CHARLES T. KINGZETT, OF 17 LANSDOWNE ROAD, TOTTENHAM, AND MAXIMILIAN ZINGLER, OF 19 BUCKLAND CRESCENT, BELSIZE PARK, COUNTY OF MIDDLESEX, ENGLAND.

DISINFECTANT.

SPECIFICATION forming part of Letters Patent No. 281,521, dated July 17, 1883.

Application filed December 12, 1882. (No specimens.) Patented in England November 23, 1882, No. 5,572.

*To all whom it may concern:*

Be it known that we, CHARLES THOMAS KINGZETT, Fellow of the Institute of Chemistry of Great Britain and Ireland, and Fellow of the Chemical Society, analytical and consulting chemist, and MAXIMILIAN ZINGLER, Fellow of the Chemical Society, subjects of the Queen of Great Britain, residing, respectively, at 17 Lansdowne Road, Tottenham, and 19 Buckland Crescent, Belsize Park, both in the county of Middlesex, England, have invented certain new and useful Improvements in Antiseptics, Disinfectants, and Deodorants, (for which we have made application for Letters Patent in Great Britain, No. 5,572, dated November 23, 1882;) and we do hereby declare that the following is a full, clear, and exact description of the invention, which will enable others skilled in the art to which it appertains to make and use the same.

This invention relates to the production of a fluid mixture or composition to be employed as an antiseptic and disinfectant.

The essential components of our fluid mixture are:

First. A liquid volatile hydrocarbon spirit containing a terpene, and obtained from pine-tree products by distillation. Spirits of turpentine, rosin-spirit, and pine-oil are liquids of this class, and are suitable.

Second. Rosin—a non-volatile pine-tree product. Either common rosin, known as "colophony," may be employed, or crude turpentine, which is rosin that has not been distilled, and therefore contains some spirit.

Third. Rosin-oil, which is a product of the destructive distillation of rosin.

In producing our composition a good way to proceed is as follows: Dissolve one hundred-weight (one hundred and twelve pounds) of common rosin, known as "colophony," or of crude turpentine, known also as "gum-thus," (Barras-gallipot,) in twenty gallons of turpentine, or rosin-spirit, or pine-oil of commerce. Then dissolve therewith about twenty pounds camphor, and then mix sixty gallons of rosin-oil with the solution. The product may be used as thus prepared; but we also prefer to oxidize the hydrocarbon portions of the mixture, although this is not essential, by exposing the latter at about 60° centigrade to a current of air during a period of, say, twenty-four hours, or more. The operation of air-oxidizing may take place either in the presence or absence of water; or, instead of proceeding as described, we sometimes oxidize the turpentine, or rosin-spirit, or pine-oil (according to which of these substances we wish to employ) in the first place, and then proceed to make use of the oxidized product, as above described—viz., to dissolve therein a quantity of common rosin or crude turpentine, together with a proportion of camphor, mixing with the product a quantity of rosin-oil.

We may vary the proportions of the several constituents somewhat; but the quantities above mentioned we have found to give useful results.

The fluid mixture or solution hereinbefore described possesses powerful properties as an antiseptic, disinfectant, deodorant, and oxidant, and it may be employed in the fluid state. It may also be mixed with any suitable earthy or other basis—such as with silica or sand, or lime or chalk, or sawdust or other suitable material—to prepare solid mixtures or powders having similar properties, such powders or solid mixtures being used in the way that is well understood for deodorizing and disinfecting offensive and infectious materials; or the fluid may be emulsified with water, or with a watery solution of gum-acacia, or with a solution of caustic alkali, or the carbonate of an alkaline base, and the emulsions thus prepared may be used for the preservation of organic matters from putrefactive decay and decomposition, or for deodorizing purposes and for fumigating; or the fluid may be used in the manufacture of soap, or incorporated in soaps by means which are well understood, in order to produce antiseptic and disinfecting soaps.

What we claim as our invention is—

The fluid composition of matter hereinbefore described, consisting of liquid volatile hydrocarbon spirit containing terpene, non-volatile rosin, camphor, and rosin-oil, as set forth.

C. T. KINGZETT.
M. ZINGLER.

Witnesses:
J. WATT,
JNO. DEAN,
*Both of 17 Gracechurch St., London.*